May 10, 1927.
R. I. CLAPP
NUT LOCK
Filed July 13, 1925
1,628,355
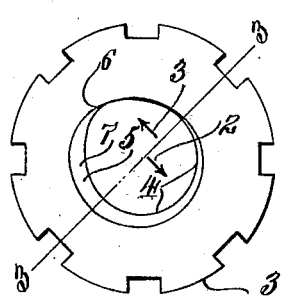
Fig.1
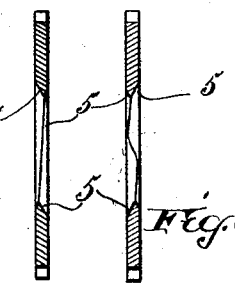
Fig.2
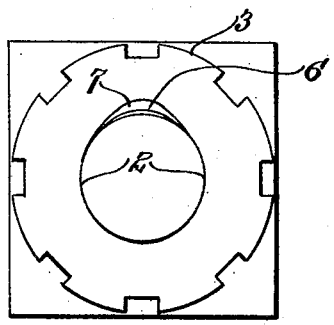
Fig.9
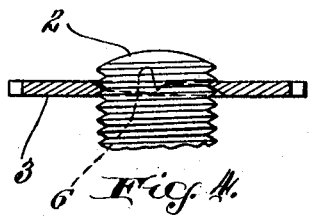
Fig.4
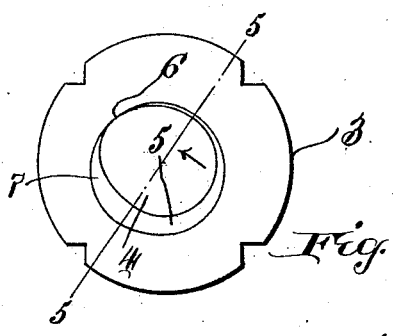
Fig.6
Fig.5
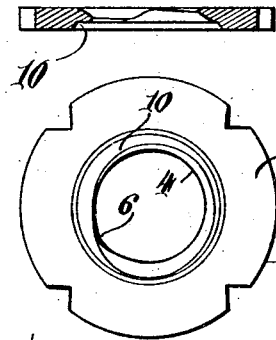
Fig.7
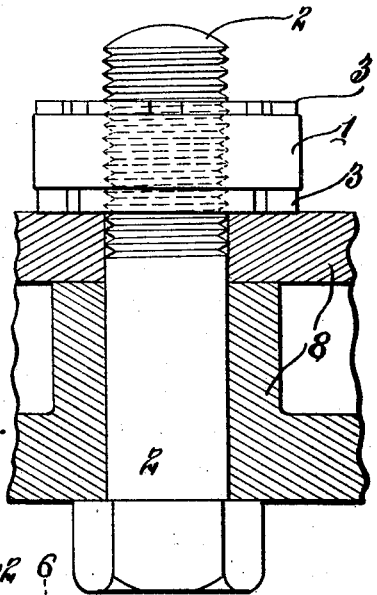
Fig.8
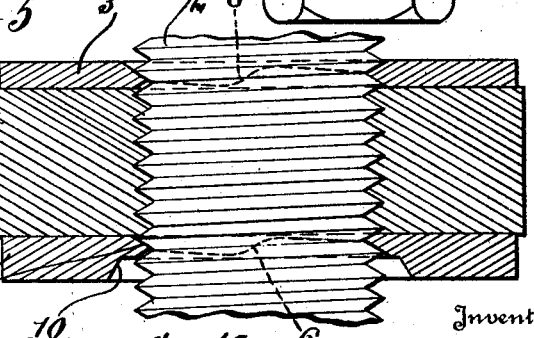
Fig.10
Inventor
Roger I. Clapp.
By Edwin F. Samuels
Attorney
WITNESSES Patented May 10, 1927.

1,628,355

UNITED STATES PATENT OFFICE.

ROGER I. CLAPP, OF SHANGHAI, CHINA.

NUT LOCK.

Application filed July 13, 1925. Serial No. 43,113.

The invention relates to a locking device for nuts and bolts, the lock being in the form of a locking plate having a bore or opening slightly larger than the diameter of the bolt at the base of the thread and at one point having a slightly increased radius to permit the plate to cross the thread, the plate being bevelled as to the edges of the bore preferably on both sides of the plate, the bevel on each side of the plate immediately to the left of said point of increased radius extending almost the full width of the plate, allowing but a slight opposite bevel on the other side of the plate, and the bevel on each side tapering from the said point of greatest radius to the left about the hole, i. e., in a counterclockwise direction until as it approaches the point of greatest radius on the right, it almost disappears. The increase of radius gives the bore an egg-shaped outline.

The bevelling as described causes the edge of the aperture when the lock washer is tightened up, to act for about five-sixths of its circumference as a circular wedge between the thread against which it rests above and the surface of the nut, the point of the wedge being in effect immediately at the left of the point of greatest radius and the butt at the right of the same when the bolt thread is righthanded.

In practice one, two or more of the locking plates or washers may be used with a nut or several of the plates may be used without a nut, and with the nut it may be used either as a washer under the nut or as a lock nut over the nut, or two of the locking plates may be used, one under the nut as a washer and the other over it, and to give increased security, the locking plate may be bent about the nut or otherwise fastened, or the wedging action of the locking plate may be relied upon to give the desired effect without other provisions for locking.

In the accompanying drawing I have illustrated nut and bolt locking means embodying my invention.

In the drawing—
Figure 1 is a plan of the nut locking plate or washer.

Figure 2 is a section looking in the direction of arrow 2 from line 3, 3 Figure 1.

Figure 3 is a section on the line 3, 3 of Figure 1, looking in the direction of arrow 3.

Figure 4 is an elevation of a bolt having the locking-plate engaged therewith and showing the angle of the plate before it is deflected by forcing against a flat surface in locking.

Figure 5 is a section parallel to the axis through a locking plate or washer having the edge cut away on account of the thickness of the plate looking at the point of greatest radius of the opening. The section is taken on line 5, 5 of Figure 6.

Figure 6 is a plan of the same looking at the side opposite the cut-away portion.

Figure 7 is a plan looking at the opposite or cutaway side of the plate.

Figure 8 is an elevation of a nut and bolt, and parts held thereby, the bolt being secured by means of two locking plates, one being used as a washer and the other as a lock nut.

Figure 9 is a top plan of the same.

Figure 10 is a section through a nut secured by two locking plates, the bolt being shown in elevation.

Referring to the drawings by numerals, each of which is used to indicate the same or similar parts in the different figures, the nut 1 is held in position on the bolt 2 by means of locking plates or lock washers 3, the plate having its aperture 4 which receives the nut, bevelled at 5, on opposite sides of the plate as illustrated in Fig. 3. The bevel is further somewhat off-centre, and the hole is cut away at one point at 6 of greatest radius where the greatest bevel on the two sides of the plate meets, providing a point where the plate crosses the thread, so that the plate on one side of this point rests in one turn of the groove, and on the opposite side in the next turn of the groove, the point of greatest radius by crossing the thread, enables the plate with a bore, the diameter of which is only sufficiently in excess of that at the base of the groove, to permit the plate to fit in and slide along the base of the groove to pass on to the threaded portion of the bolt. Without this point 6 of excess radius, the bolt would not enter the aperture at all. The bevel 5 on opposite sides of the plate thus engaging the thread for approximately five-sixths of the circumference, forms a circular wedge which can be forced between the surface of the nut or other member through which the bolt is passed and the thread, producing the locking action which is the function of the device.

It may be said in further explanation of the wedge action and of the form and location of the two bevelled surfaces, that looking at the plate from either side the widest bevel 7 at the left of the point 6 on the visible side of the plate, extends across almost the entire thickness of the plate, and following around the bore to the left the bevelled surface 5 grows gradually narrower, almost blending into the visible flat surface, and the opposite bevel being similar, the visible bevel is in fact cut away by the opposite bevel as the visible bevel is followed to the left. The description relates to the practice with a bolt and nut having a right-handed thread.

To assemble and lock a bolt and nut as illustrated in Figure 10, the bolt 2 is first inserted, the locking plate 3 is then passed over the end of the bolt and screwed down against the work 8. The nut 1 is then screwed down against the plate 3 which has been set tight in right-handed rotation in accordance with the direction of the thread shown, and forced down flat, and a second washer or plate 3 is then passed over the end of the bolt and turned down tight and flat against the nut. Two plates are not, however, ordinarily regarded as necessary, and where a single locking plate is used, it is preferably applied over the nut after the manner of a lock nut.

In Figure 7 I have shown a locking plate 9 of excess thickness. In this instance to dispense with the surplus metal about the opening, I have counter-sunk or otherwise removed a portion of the metal around the hole at 10 so as to give a thin edge 11 of a thickness approximately that of the locking plate 3. The edge 11 is then bevelled as originally described.

In operation the bevel 7 at the left of the point 6 leads and acts as the point of a wedge between the bolt thread and the flat surface of the nut, the edge of the plate at the right of point 6 being the butt of the wedge which in tightening of the plate is forced between the thread and the surface of the nut or other member in which the bolt is being locked, wedging or locking the bolt relatively to the nut.

Having thus described my invention, what I claim and desire to secure by Letters Patent is:

In combination with a threaded bolt and nut of a locking plate, the plate having an opening of a diameter corresponding to the diameter of the bolt at the basis of the threads and bevelled as to its margin on both sides of the plate to enter the thread groove, the bevel on the two sides increasing in width about the circumference of the opening in opposite directions of rotation, the opening having a point of increased diameter to allow the bevel to cross the thread, the increased diameter being produced by the meeting of the maximum bevels on the opposite sides, and the plate lying flat in locked position.

Signed by me at Shanghai, China, this 15th day of June, 1925.

ROGER I. CLAPP.